United States Patent
Scotti et al.

(10) Patent No.: US 6,813,540 B2
(45) Date of Patent: Nov. 2, 2004

(54) SYSTEM AND METHOD FOR SUPPLYING MATERIAL

(75) Inventors: Gregory R. Scotti, Brimfield, IL (US); Terry R. Parker, Warrensburg, IL (US); Vernon L. Carey, Pekin, IL (US); Rhett Barnes, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 208 days.

(21) Appl. No.: 10/035,780

(22) Filed: Dec. 26, 2001

(65) Prior Publication Data

US 2003/0120378 A1 Jun. 26, 2003

(51) Int. Cl.$^7$ .............................................. G06F 7/00
(52) U.S. Cl. ........................................................ 700/216
(58) Field of Search ............................... 700/213, 216, 700/99, 112, 116, 95, 97; 705/8

(56) References Cited

U.S. PATENT DOCUMENTS

| 5,193,065 | A | | 3/1993 | Guerindon et al. ......... 364/468 |
| 5,231,567 | A | * | 7/1993 | Matoba et al. .............. 700/100 |
| 5,373,451 | A | * | 12/1994 | Furukawa .................... 700/228 |
| 5,699,259 | A | * | 12/1997 | Colman et al. ............... 700/99 |
| 5,712,989 | A | * | 1/1998 | Johnson et al. ............... 705/28 |
| 5,897,624 | A | * | 4/1999 | Ramaswamy ................ 705/28 |
| 6,415,266 | B1 | * | 7/2002 | Do .............................. 705/28 |
| 6,594,535 | B1 | * | 7/2003 | Costanza ..................... 700/97 |
| 6,662,076 | B1 | * | 12/2003 | Conboy et al. ............. 700/214 |
| 2002/0087227 | A1 | * | 7/2002 | Tozawa et al. ............... 700/95 |

* cited by examiner

Primary Examiner—Donald P. Walsh
Assistant Examiner—Mark J. Beauchaine (57) ABSTRACT

A system and method manage material supply for an assembly area or process. The system and method are adapted to supply or request material in response to actual demand for the material.

67 Claims, 3 Drawing Sheets

SYSTEM AND METHOD FOR SUPPLYING MATERIAL

TECHNICAL FIELD

The present invention relates generally to a system and method for ordering material, and more specifically, to a system and method for ordering material in response to demand for the material in a process.

BACKGROUND

The process of manufacturing a product presents many challenges to bring the product to market for the least cost and within schedule, while maintaining product quality. Manufacturing the product for the least cost is important in all industries. Inventory is one of the primary costs associated with manufacturing a product.

In traditional assembly line operations, a central storage location is used to store material or parts until they are needed. When the parts are needed on the assembly line from the central storage location, the parts are delivered to an assembly line storage location from the central storage location. At the appropriate time a part is taken from the assembly line storage location and then used on the assembly line. The assembly line storage locations are supplied by replenishing inventory from the central storage location, when the supply at the assembly line storage location drops below a threshold. For example, once the parts at the assembly line storage location drops below the threshold, another lot of parts is delivered to the assembly line storage from the central storage location. In addition, once the number of parts in the central storage location is reduced below a threshold, a number of additional parts are ordered from the supplier.

However, typically the replenishing of the assembly line storage location or the central storage location are based on forecasting or other types of inventory filling techniques based on prior usage. For example, the supplier of a part could be instructed to deliver X number of parts every Y months. These techniques require maintaining and tracking a large inventory of the parts.

Furthermore, forecasting methods by their very nature of being a prediction, are not 100% accurate. The accuracy of forecasting methods are may be further reduced when the product being assembled is highly configurable. In other words, the product being assembled are different types or configurations and the parts needed for each product may be different.

The present invention is aimed at one or more of the problems set forth above.

SUMMARY OF THE INVENTION

In a first aspect of the present invention, a method of managing material supplied to an assembly process is provided. The method includes the steps of establishing an actual demand for the material, generating a replenishment signal, and supplying the material in response to the replenishment signal.

In a second aspect of the present invention, a method of managing material supplied to an assembly process is provided. The assembly process produces a plurality of items and is divided into a plurality of stages. Each item is represented by an order. The method includes the steps of monitoring a stage of at least one of the orders, establishing an event in the assembly process in response to actual demand for the material, and generating a replenishment signal in response to occurrence of the event.

In a third aspect of the present invention, a method of managing material supplied to an assembly process is provided. The assembly process produces a plurality of items and is divided into a plurality of stages. Each item is represented by an order. The material includes a part to be delivered by a supplier. The method includes the steps of establishing an event in the assembly process, generating a replenishment signal for the part, wherein the part is required at a later stage, and generating a replenishment signal in response to the demand.

In a fourth aspect of the present invention, a method of managing material supplied to an assembly process is provided. The assembly process produces a plurality of items and is divided into a plurality of stages. Each item is represented by an order, wherein the material includes a part to be delivered by a supplier. The method includes the steps of establishing an event in the assembly process and generating a replenishment signal for the part in response to occurrence of the event. The part is required at a later stage for a second order.

In a sixth aspect of the present invention, a method of managing material supplied to an assembly process is provided. The method includes the steps of dynamically determining a demand rate and an order point and generating a replenishment signal when an amount of the material in process is less than the order point.

In a seventh aspect of the present invention, a system for managing material supply is provided. The system includes an assembly area for receiving material and producing items using an assembly process and a computer system coupled to the assembly area. The system is adapted to supply material to the assembly area in response to actual demand.

In an eighth aspect of the present invention, a method of managing material supplied to an assembly process is provided. The method includes the steps of establishing an actual demand for the material, generating a replenishment signal in response to the actual demand, and requesting the material in response to the replenishment signal.

In a ninth aspect of the present invention, a method of managing material supplied to an assembly process is provided. The method includes the steps of establishing an actual demand for the material, generating a replenishment signal in response to the actual demand, and receiving the material in response to the replenishment signal.

DETAILED DESCRIPTION

With reference to FIGS. 1–6, the present invention provides a method 200, 300, 400, 500, 600 and system or apparatus 100 for managing material supplied to an assembly process for assembly of product.

Figure 1:
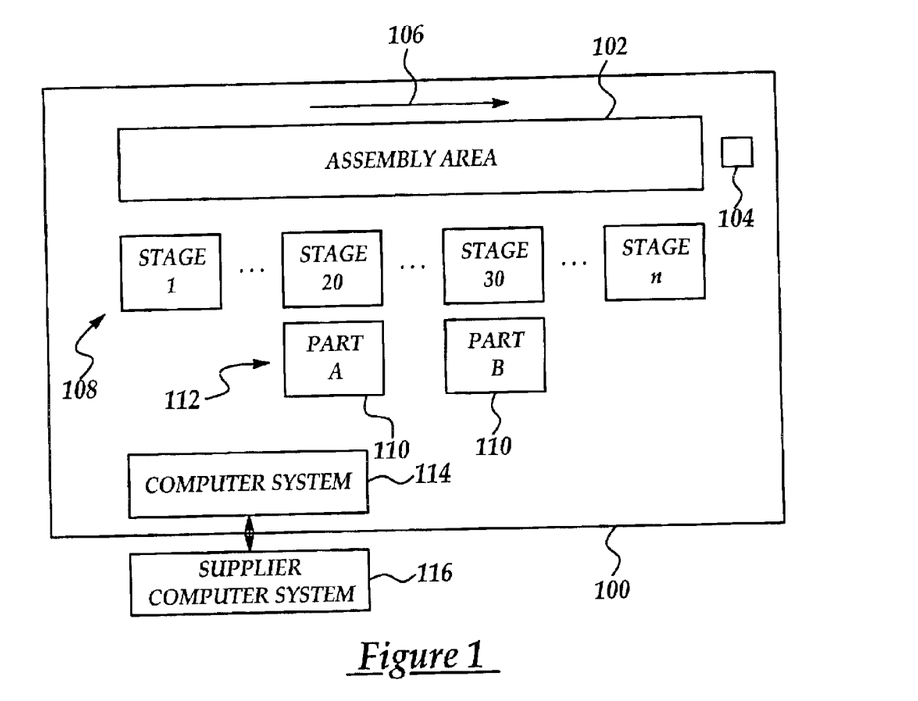
FIG. 1 is a block diagram of an assembly environment includes an assembly area and a computer system utilized in supplying material to the assembly area, according to an embodiment of the present invention.

The assembly process is performed at an assembly area 102. In one embodiment, the assembly area 102 is an assembly line. In another embodiment, the assembly area 102 includes a plurality of assembly work areas at which a complete product (or item) or a portion of a complete product 104 are assembled. Products which may be assembled in the assembly area 102 include, but is not limited to, machines (such as engines, automobiles, mobile machines, construction or earthmoving equipment), computers, electronics, consumer items (e.g., toasters, refrigerators, washers, etc. . . . ), or any other items made from materials which must be assembled or utilized to form the final product.

For purposes of explanation the present invention will be explained in relation to an assembly line 102. However, the present invention is equally applicable to other types of assembly areas, and is thus, not limited to an assembly line.

With specific reference to FIG. 1, the product 104 is assembled left to right (in the direction of arrow 106). The product 104 is shown as a finished product 104 to the right of the assembly line 102. The assembly line 102 includes a plurality of stages 108. In the illustrated example, the assembly line 102 includes stages 1 through n (only stages 1, 20, 30, and n are shown).

Material 110 from one or more suppliers may be delivered to areas (material delivery locations) 112 associated with the stages 108. In one embodiment, the area is next to the stage 108. In one embodiment, the material 110 is delivered directly to the stage 108. In another embodiment, the material is delivered to a receiving area and then transferred to the appropriate location. For example, in the illustrated assembly line 102, the material 110 delivered to the material delivery locations includes parts A and B. As shown, parts A and B are delivered to stages 20 and 30, respectively. It should be noted that although the discussions are related to a single part delivered to a stage, typically multiple parts are delivered to the same stage.

In one aspect of the present invention, the system 100 includes a computer system 114. In one embodiment, the computer system 114 includes at least one mainframe computer. In another embodiment, the computer system 114 includes a plurality of workstations, personal computers or the like.

The computer system 114 is linked to the assembly area 102. Information gathered and/or entered into the computer system 114 is used to assemble and publish information related to the assembly process and to generate signals related to the supply of material to the assembly area (see below).

Figure 2:
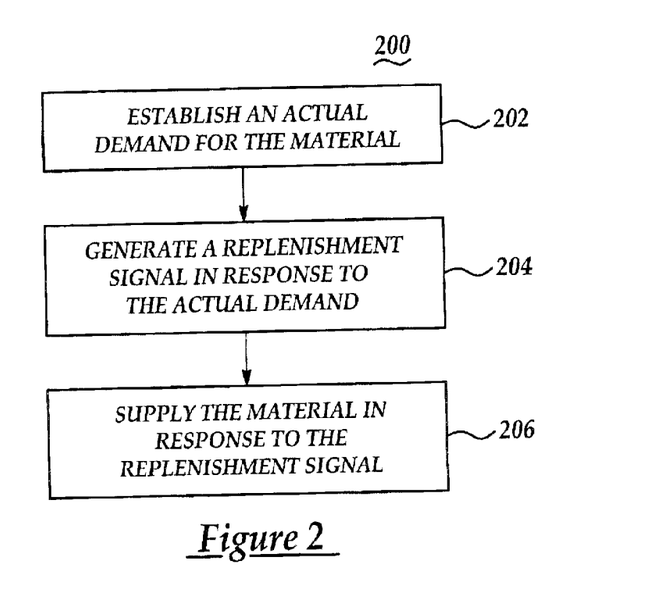
FIG. 2 is a first flow diagram of a process for supplying material to an assembly process, according to a first aspect of the present invention.

With reference to FIG. 2, a method of managing material 110 supplied to an assembly process, according to a first aspect of the present invention will now be discussed. In a first process block 202, an actual demand for the material 110 is established. The actual demand for the material 110 is established based on actual data related to the current state of the assembly process in the assembly area. In one embodiment, the computer system 114 gathers data concerning the status of the assembly process automatically (through electronic monitoring of the assembly process) or input by operators (not shown) working in the assembly process. As discussed below, in aspects of the invention, replenishment techniques which may be used to establish the actual demand for the material include: Supplier Managed Delivery (SMD), Supplier Demand Sharing (SDS), Single Order Event Pull (SOEP), Relative Sequence Event Pull (RSEP), and Dynamic Order Point (DOP). Each of these is described below.

Returning to FIG. 2, in a second process block 204, a replenishment signal is generated in response to the actual demand. In a third process block 206, the material 110 is supplied in response to the replenishment signal. In one embodiment, the replenishment signal is a communication to the supplier with instructions to deliver more material. The communication may be sent by any method including an oral communication (in person or telephone), facsimile, or other similar means. In another embodiment, the replenishment signal is an electronic signal. As shown in FIG. 1, the system 100 includes a supplier computer system 116 coupled to the computer system 114. The computer system 114 and the supplier computer system 116 may be coupled by any suitable means, such as telephone lines, a direct connection, a computer network (either dedicated or a public network, such as the internet). In another embodiment, the replenishment signal is a set of predetermined conditions based on the actual demand (see below).

In another aspect of the present invention, a method of managing material supplied to an assembly process is provided. The method includes the steps of establishing an actual demand for the material, generating a replenishment signal in response to the actual demand, and requesting the material in response to the replenishment signal.

In still another aspect of the present invention, a method of managing material supplied to an assembly process is provided. The method includes the steps of establishing an actual demand for the material, generating a replenishment signal in response to the actual demand, and receiving the material in response to the replenishment signal.

The Supplier Managed Delivery (SMD) Replenishment Technique

In the SMD technique, the material 110 is delivered to the respective material delivery location 112 based on the consumption of material at the corresponding stage 108. In one embodiment of the present invention, the supplier is provided with information associated with the final assembly demand and demand status. The final assembly demand and demand status includes some or all of the orders which are in process at the assembly area 102 and the parts (to be supplied by a specific supplier) which are required for each order. The supplier may have agreed to supply parts or material 110 relative to the final assembly demand and demand status.

For example, assume that a supplier, S, supplies parts A and B to the assembly line 102. These parts are used at stages 20 and 30, respectively. Each product 104 that is produced on the assembly line 102 has an associated order or order number, e.g., the first product 104 that is assembled is order 1, followed by order 2, and so on. In one embodiment, the products 104 for each order are the same. In another embodiment, the products 104 for each order are different. Each item may be represented by an order. In this example, parts A and B are utilized for the same order or product 104.

In one aspect of the present invention, the information associated with demand provided to the supplier includes a build sequence, e.g., the orders and the product corresponding to each order being built. In one embodiment, the demand view for a particular supplier includes only those product and orders for which the supplier supplies parts. Alternatively, other information may be provided which is associated with other parts.

For example, assume that all of the orders (or a string of orders) are for the same product 104 and the products 104 require part A. The supplier, S, of part A is provided with information of the final assembly demand and status. The information of the final assembly demand and status may include a list of the orders for which the supplier, S, must provide material. The view provides the supplier with the information required in order to deliver part A as needed. Typically, supplier has agreed to deliver the material according to a set of conditions related to the view. For example, in one embodiment all material is categorized. For example, the material may be categorized as "in process" or "consumed". Material categorized as in process includes parts which have been prepared by the supplier and have been shipped, delivered and/or received at the facility. Once the material has been used or incorporated into a product 104, the material has been consumed. Material prior to being categorized as shipped may be categorized as preparing, e.g., manufacturing, finished, and ready to be shipped).

In one embodiment, the supplier has agreed to maintain a predetermined number or amount of the material in the pipeline or "in process". For example, returning to the above example, the supplier may have agreed to keep five of part A in process. Using the information related to demand, the supplier is able to see which orders are going to require part A and thus can schedule to maintain five of part A in process.

Thus, the supplier's delivery of parts is tied to actual demand. As the rate of products 104 leaving the assembly area 102 which require a part delivered by the supplier, S, increases (due to an decrease in assembly time or an increase in the number of products 104 which require part A relative to the number of products which do not require part A), the rate at which the supplier, S, supplies the part A increases. Conversely, as the rate of products 104 which require part A decreases, so does the rate at which the supplier, S, must deliver part A. However, since delivery is directly tied to actual demand, i.e., consumption, the supplier, S, delivers the correct amount of part A.

Figure 3:
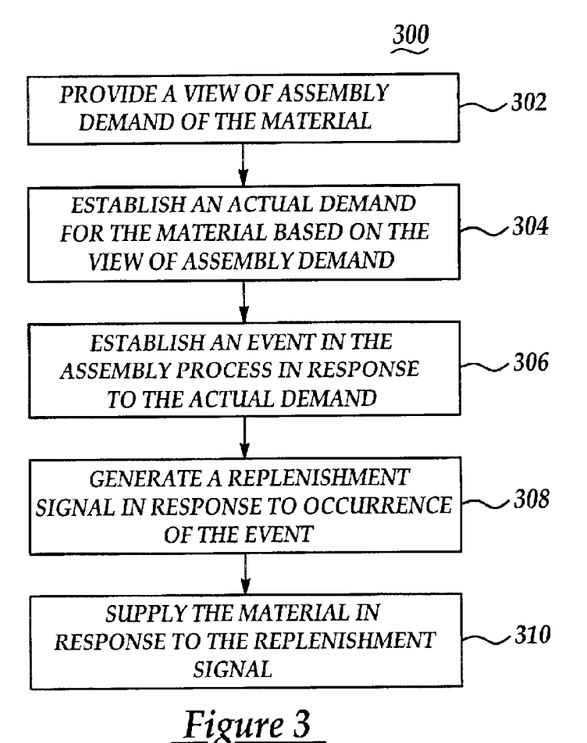
FIG. 3 is a second flow diagram of a process for supplying material to an assembly process, according to a second aspect of the present invention.

With reference to FIG. 3, a method 300 for managing material 110 supplied to an assembly process using the SMD replenishment technique, according to an embodiment of the present invention, will now be described. In a first process block 302, information associated with assembly demand of the material is provided. In a second process block 304, an actual demand for the material is established based on the view of assembly demand. In a third process block 306, an event or trigger is established or defined in the assembly process in response to the actual demand.

As discussed above, in one embodiment, the event may be related to the number or amount of material 110 which the supplier has in process. For example, the event may be defined as the number or amount of material 110 in process falling below a predetermined amount. In one embodiment of the SMD technique, the event is monitored for by the supplier based on the information associated with the assembly process received by the supplier.

In a fourth process block 308, a replenishment signal is generated in response to occurrence of the event. In a fifth process block 310, the material is supplied in response to the replenishment signal.

The Single Order Event Pull (SOEP) and Supplier Demand Sharing (SDS) Replenishment Techniques In the SOEP and SDS replenishment techniques, material 110 is delivered to a material deliver location 112 based on a previous event in the assembly process associated with the same order. In the single order event pull technique, the event is detected at the assembly area 102 and a replenishment signal is relayed to the supplier. The replenishment signal may be any type of communication, electronic or otherwise. For example, the replenishment signal may be communicated by mail, telephone, facsimile, email, or other suitable means. In the supplier demand sharing technique, the supplier, S, is given access to information associated with the assembly area 102, similar to the demand view of the SMD technique described above. In the SDS technique, the replenishment signal may be the occurrence of the event which is then relayed to the supplier. In one embodiment, the supplier may detect the event or the occurrence of the replenishment signal.

In one embodiment, the event may be defined by the completion of an order at a particular stage, processing of an order at a particular stage, arrival of an order at a particular stage or arrival or consumption of material at a stage.

For example, the event may be defined as the completion of stage 1 by an order which requires part A at stage 20. In the SOEP technique, upon completion of stage 1 by the order, the replenishment signal is sent to the supplier If the SDS technique is being used, the supplier detects the event, i.e., the completion of stage 1 by an order requiring part A at stage 20.

Figure 4:
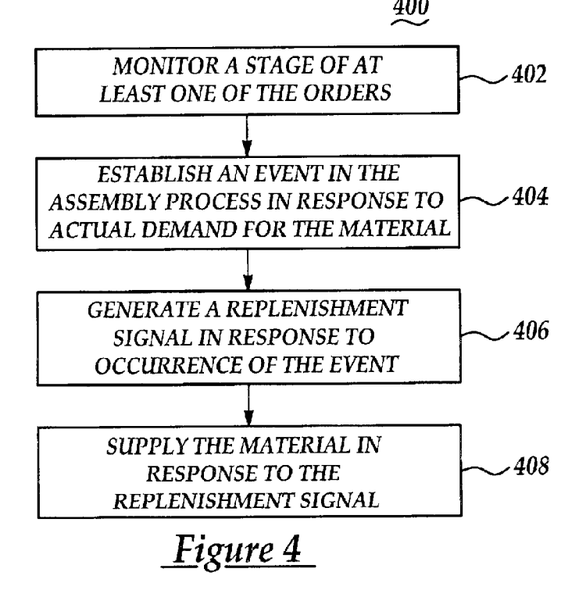
FIG. 4 is a third flow diagram of a process for supplying material to an assembly process, according to third aspect of the present invention.

With reference to FIG. 4, a method 400 for managing material using a replenishment technique (SOEP or SDS), according to an embodiment of the present invention will now be discussed. In a first process block 402, a stage of the assembly process is monitored. An event in the assembly process is established in response to actual demand for the material in a second process block 404. In a third process block 406, a replenishment signal is generated in response to occurrence of the event. In a fourth process block 408, the material 104 is supplied in response to the replenishment signal. As discussed above, the event may be defined as completion of a stage by the order which requires the material at a later stage. An event or trigger is a condition or set of conditions which, when present, the event is said to occur.

The Relative Sequence Event Pull (RSEP) Replenishment Technique

In the RSEP replenishment technique, material 110 is delivered to a material delivery location 112 for one order based on a based on an event in the assembly process associated with another order. One application of the RSEP technique is for material which has a long lead or delivery time. In other words, the order has not yet begun the assembly process and by the time the assembly process has begun, it will be too late for the part to be delivered.

Returning to FIG. 1, assume again that the build sequence begins at order 1 and proceeds to order 2 and so on. The first order to require part A is order number 51. Order number 51 requires part A at stage 20. However, once order 51 is begun (at stage 1) there is not enough time to order part A and have it delivered to stage 20 by the time order 51 reaches stage 20. In order to have part A delivered in time, it must be ordered before the order has begun. Therefore, ordering of the part cannot be linked to an event occurring after order 51 has begin.

In one aspect of the present invention, the material (part A) is ordered based on an event of an earlier order. In one embodiment, the event is linked to a predetermined stage.

When an order (x) has completed the predetermined stage, the system 100 looks forward a predetermined number (y) of orders to determine if part A is needed for that order (x+y). If the order x+y requires part A, part A is ordered. In one embodiment, if multiple parts are located at the predetermined stage, the system looks ahead to see if any of the multiple parts are needed.

Returning to the earlier example, assume the predetermined stage is stage 30 and the predetermined number of orders (y) is 50. When order number 1 has completed stage 30, the system 100 looks forward 50 orders to order 51. Order 51 requires part A at station 20. Therefore part A is ordered.

Figure 5:
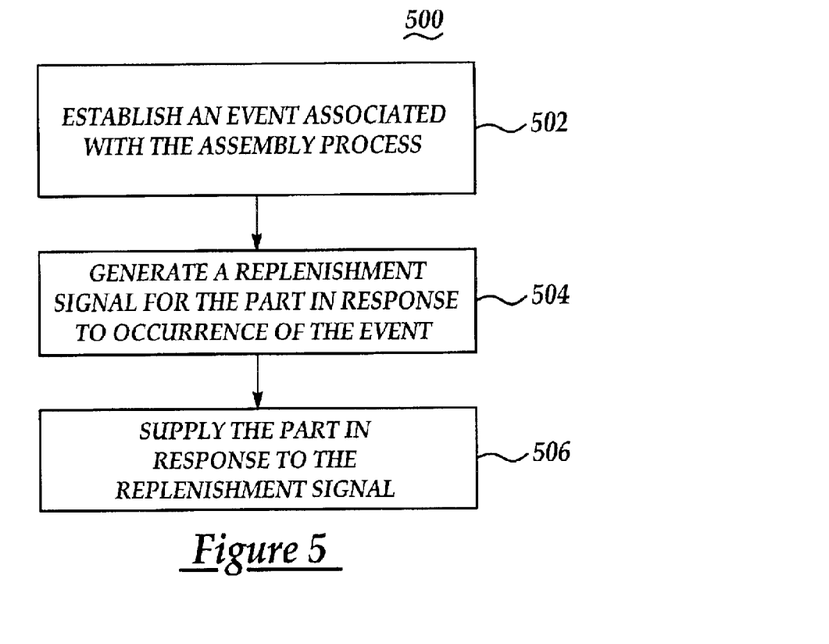
FIG. 5 is a fourth flow diagram of a process for supplying material to an assembly process, according to a fourth embodiment of the present invention; and, FIG. 6 is a fifth flow diagram of a process for supplying material to an assembly process, according to a fifth aspect of the present invention.

With reference to FIG. 5 a method 500 of managing material 104 supplied to an assembly process using the RSEP technique, according to an embodiment of the present invention will now be discussed. In a first process block 502, an event associated with the assembly process is established or defined.

In one embodiment, the event may be defined by the completion of an order at a particular stage, processing of an order at a particular stage, arrival of an order at a particular stage or arrival or consumption of material at a stage.

In a second process block 504, a replenishment signal for the part in response to occurrence of the event is established. The part is required at another stage for a second order. In a third process block 506, the part is supplied in response to the replenishment signal.

The Dynamic Order Point (DOP) Replenishment Technique

In the DOP replenishment technique, an order for material is placed or sent to a supplier whenever the quantity on hand plus the quantity on order is reduced to a dynamically determined level (known as the dynamically determined order point or dynamic order point). The system 100 allows the dynamic order point to be updated based on actual demand at the assembly area 102.

Figure 6:
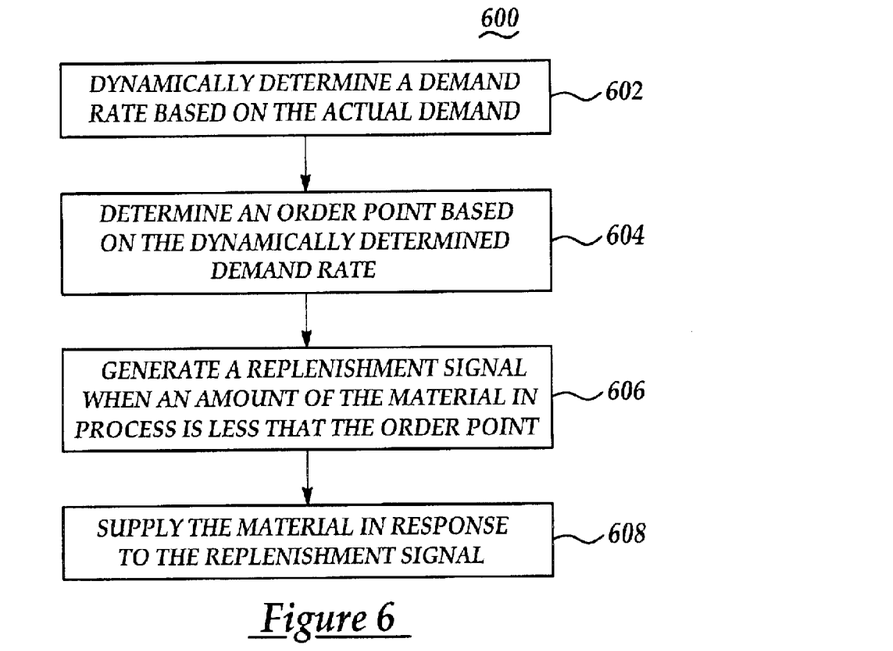

With reference to FIG. 6, a method 600 of managing material 104 supplied to an assembly process using the DOP technique, according to an embodiment of the present invention will now be discussed. In a first process block 602, a demand rate is determined based on actual demand. The demand rate is the rate at which the material is being consumed and needs to be replaced. In a second process block 604, an order point is determined based on the dynamically determined demand rate. In a third process block 606, a replenishment signal is generated when an amount of the material in process (on hand or on hand plus on order) is less than the order point. In a fourth process block 608, the material 110 is supplied in response to the replenishment signal.

In one embodiment, the demand rate and the order point are determined periodically. In another embodiment, the demand rate and the order point are determined upon the request of a user (not shown).

In one embodiment, the dynamically determined order point is calculated using the following formula:

OP=D×LT+SS, where OP is the order point, D is a demand rate, LT is a lead time, and SS is a safety stock.

In one aspect of the present invention, the demand rate (D) is determined based on actual data from the assembly process. The safety stock and lead time may be input, modified, or updated by the user.

Electronic Kanban

In a further embodiment of the present invention, an order for material from a supplier is initiated by an electronic signal (via the computer system 114) to the supplier. The electronic signal is triggered by an event which indicates that the supply of material on hand is below a predetermined threshold. The current level of material on hand may be determined by a bar code scanner, an inventory system, manual entry into the computer system 114, other suitable means, or combination thereof.

INDUSTRIAL APPLICABILITY

With reference to the drawings and in operation, the present invention provides a system 100 and a method 200, 300, 400, 500, 600 for managing material 110 for an assembly process. Material 110, for example parts, used in the assembly of an item are delivered by one or more suppliers to material delivery locations 112 located at points along the assembly area or assembly line 102.

The supplier of a particular part is instructed to deliver part or parts to a material delivery location 112 based on the actual demand in the assembly process. In one aspect of the present invention, a computer system 114, coupled to the assembly area 102 gathers information relating to the assembly process and delivers a view of the demand during the assembly process to the supplier. In one embodiment, a supplier computer system 116 is coupled to the computer system 114. The supplier computer system 116 allows the supplier access to the view of demand provided by the computer system 114.

In another aspect of the present invention, the computer system 114 sends a replenishment signal to the supplier computer system 116. In one embodiment, the replenishment signal contains instructions to the supplier to deliver more material. In another embodiment, the replenishment signal is comprised of a predetermined set of conditions within the view of demand provided to the supplier.

As stated above, the present invention provides for a system 100 and method 200, 300, 400, 500, 600 for managing the material provided to an assembly area 102 based on actual demand of the material. Several different replenishment techniques are discussed above. In each of these techniques, as the need for specific materials or parts for the assembly process increase or decrease, so will the number or amount of material delivered by the supplier.

Other aspect and features of the present invention can be obtained from a study of the drawings, the disclosure, and the appended claims.

What is claimed is:

1. A method of managing material supplied to an assembly process, comprising the steps of:
   establishing an actual demand for the material;
   generating a replenishment signal in response to the actual demand; and,
   supplying the material in response to the replenishment signal.

2. A method, as set forth in claim 1, wherein the step of establishing an actual demand includes the step of establishing an event in the assembly process in response to the actual demand and wherein the replenishment signal is generated in response to occurrence of the event.

3. A method, as set forth in claim 2, wherein the assembly process is adapted to produce a plurality of items, the assembly process being divided into a plurality of stages and wherein each item is represented by an order, and wherein the method includes the steps of monitoring a stage of at least one of the orders.

4. A method, as set forth in claim 3, wherein the event is completion of a stage for the at least one of the orders.

5. A method, as set forth in claim 1, wherein the step of supplying the material is performed by a supplier.

6. A method, as set forth in claim 1, including the step of providing a view of assembly demand.

7. A method, as set forth in claim 6, wherein the step of establishing an actual demand includes the step of establishing an event in the assembly process in response to the actual demand and wherein the replenishment signal is generated in response to occurrence of the event and wherein the event is defined by the view of assembly demand.

8. A method, as set forth in claim 6, wherein the assembly process is adapted to produce a plurality of items, the assembly process being divided into a plurality of stages and wherein each item is represented by an order, and wherein the method includes the steps of monitoring a stage of at least one of the orders and wherein the step of providing a view of assembly demand includes the step of providing the view of assembly demand to a supplier of a part and wherein the view of assembly demand includes orders which include the part.

9. A method, as set forth in claim 8, including the step of categorizing the part associated with each order.

10. A method, as set forth in claim 9, wherein the parts are categorized as one of in process and consumed.

11. A method, as set forth in claim 10, including the step of instructing the supplier to maintain a predetermined number of parts in process.

12. A method, as set forth in claim 11, wherein parts categorized as in process are further categorized as one of shipped, delivered and received.

13. A method, as set forth in claim 9, wherein the parts are further categorized as one of begun, finished, ready to ship, shipped, received, and delivered.

14. A method, as set forth in claim 6, wherein the view of assembly demand includes a build sequence.

15. A method, as set forth in claim 1, wherein the assembly process is adapted to produce a plurality of items, the assembly process being divided into a plurality of stages, each item being represented by an order, wherein the material includes a part to be delivered by a supplier, and wherein the method includes the step of:

establishing an event associated with the assembly process;

generating a replenishment signal for the part, wherein the part is required at a later stage; and, delivering the replenishment signal to the supplier.

16. A method, as set forth in claim 15, including the step of delivering, by the supplier, the part to the later stage.

17. A method, as set forth in claim 1, wherein the assembly process is adapted to produce a plurality of items, the assembly process is divided into a plurality of stages, and each item is represented by an order, wherein the material includes a part to be delivered by a supplier, and wherein the method includes the step of:

establishing an event associated the assembly process, wherein the replenishment signal is related to the part and wherein the part is required at an another stage for a second order; and, delivering the replenishment signal to the supplier.

18. A method, as set forth in claim 17, including the step of delivering, by the supplier, the part for the second order to the another stage.

19. A method, set forth in claim 1, wherein the step of establishing an actual demand for the material, includes the steps of:

dynamically determining a demand rate based on the actual demand;

dynamically determining an order point based on the dynamically determined demand rate.

20. A method, as set forth in claim 19, further including the step of:

generating the replenishment signal when an amount of the material in process is less than the dynamically determined order point.

21. A method, as set forth in claim 19, wherein the steps of dynamically determining the demand rate and the order point are performed periodically.

22. A method, as set forth in claim 19, wherein the steps of dynamically determining the demand rate and the order point are performed upon the request of a user.

23. A method, as set forth in claim 19, wherein the order point is calculated using the following formula:

OP=D×LT+SS, where OP is the order point, D is a demand rate, LT is a lead time, and SS is a safety stock.

24. A method, as set forth in claim 1, wherein said actual demand includes data related to the current state of the assembly process.

25. A method, as set forth in claim 24, wherein said data includes data associated with one or more orders which are in process in an assembly area.

26. A method of managing material supplied to an assembly process, comprising the steps of:

providing information associated with assembly demand of the material;

establishing an actual demand for the material based on the information;

establishing an event in the assembly process in response to the actual demand;

generating a replenishment signal in response to occurrence of the event; and, supplying the material in response to the replenishment signal.

27. A method, as set forth in claim 26, wherein the assembly process is adapted to produce a plurality of items, the assembly process being divided into a plurality of stages and wherein each item is represented by an order, and wherein the method includes the steps of monitoring a stage of each order and wherein the step of providing a view of assembly demand includes the step of providing the view of assembly demand to a supplier of a part and wherein the view of assembly demand includes orders which include the part.

28. A method, as set forth in claim 27, including the step of categorizing the part associated with each order.

29. A method, as set forth in claim 28, wherein the parts are categorized as one of in process and consumed.

30. A method, as set forth in claim 29, including the step of instructing the supplier to maintain a predetermined number of parts in process.

31. A method, as set forth in claim 30, wherein parts categorized as in process are further categorized as one of shipped, delivered and received.

32. A method, as set forth in claim 27, wherein the parts are further categorized as one of begun, finished, ready to ship, shipped, received, and delivered.

33. A method, as set forth in claim 26, wherein the view of assembly demand includes a build sequence.

34. A method of managing material supplied to an assembly process, the assembly process being adapted to produce a plurality of items and being divided into a plurality of stages, and wherein each item is represented by an order, comprising the steps of:

monitoring a stage of at least one of the orders;

establishing an event associated with the assembly process in response to actual demand for the material;

generating a replenishment signal in response to occurrence of the event; and, supplying the material in response to the replenishment signal.

35. A method of managing material supplied to an assembly process, wherein the assembly process is adapted to produce a plurality of items, the assembly process being divided into a plurality of stages, and each item is represented by an order, wherein the material includes a part to be delivered by a supplier, and wherein the method includes the steps of:

establishing an event associated with the assembly process;

generating a replenishment signal for the part, wherein the part is required at a later stage; and, supplying the part in response to the replenishment signal.

36. A method, as set forth in claim 35, wherein the part is for the predetermined order at the later stage.

37. A method, as set forth in claim 35, wherein the part is for another order at the later stage.

38. A method of managing material supplied to an assembly process, wherein the assembly process is adapted to produce a plurality of items, the assembly process being divided into a plurality of stages, each item being represented by an order, wherein the material includes a part to be delivered by a supplier, comprising the steps of:

establishing an event associated with the assembly process;

generating a replenishment signal for the part in response to occurrence of the event, wherein the part is required at an another stage for a second order; and, supplying the part in response to the replenishment signal.

39. A method of managing material supplied to an assembly process, comprising the steps of:

dynamically determining a demand rate based on an actual demand for the material;

determining an order point based on the dynamically determined demand rate;

generating a replenishment signal when an amount of the material in process is less than the order point; and, supplying the material in response to the replenishment signal.

40. A method, as set forth in claim 38, wherein the steps of dynamically determining the demand rate and determining the order point are performed periodically.

41. A method, as set forth in claim 38, wherein the steps of dynamically determining the demand rate and determining the order point are performed upon the request of a user.

42. A method, as set forth in claim 38, wherein the order point is calculated using the following formula:

$OP = D \times LT + SS$, where OP is the order point, D is a demand rate, LT is a lead time, and SS is a safety stock.

43. An apparatus, comprising:

an assembly area for receiving material and producing items using an assembly process; and, a computer system coupled to the assembly area, the computer system being adapted to establishing an actual demand for the material and to generate a replenishment signal in response to the actual demand.

44. An apparatus, as set forth in claim 43, wherein the actual demand is related to an event in the assembly process and wherein the computer system is adapted to generate the replenishment signal in response to occurrence of the event.

45. An apparatus, as set forth in claim 44, wherein the assembly process is adapted to produce a plurality of items, the assembly process being divided into a plurality of stages and wherein each item is represented by an order, and wherein the computer system is adapted to monitor a stage of at least one of the orders.

46. An apparatus, as set forth in claim 43, wherein the event is completion of a stage for the at least one of the orders.

47. An apparatus, as set forth in claim 43, wherein a supplier supplies the material in response to receiving the replenishment signal.

48. An apparatus, as set forth in claim 43, wherein the computer system is adapted to provide a view of assembly demand.

49. An apparatus, as set forth in claim 48, wherein the computer system is adapted to establish an event in the assembly process in response to the actual demand and to generate the replenishment signal in response to occurrence of the event, wherein the event is defined by the view of assembly demand.

50. An apparatus, as set forth in claim 48, wherein the assembly process is divided into a plurality of stages and wherein each item is represented by an order, and wherein the computer system is adapted to monitor a stage of at least one of the orders and wherein the apparatus includes a supplier computer system coupled to the computer system, wherein the view of assembly demand is delivered to the supplier computer system and wherein the view of assembly demands includes the part.

51. An apparatus, as set forth in claim 50, wherein the parts associated with each order are categorized.

52. An apparatus, as set forth in claim 51, wherein the parts are categorized as one of in process and consumed.

53. An apparatus, as set forth in claim 52, wherein a supplier of the part is instructed to maintain a predetermined number of parts in process.

54. An apparatus, as set forth in claim 53, wherein parts categorized as in process are further categorized as one of shipped, delivered and received.

55. An apparatus, as set forth in claim 51, wherein the parts are further categorized as one of begun, finished, ready to ship, shipped, received, and delivered.

56. An apparatus, as set forth in claim 48, wherein the view of assembly demand includes a build sequence.

57. An apparatus, as set forth in claim 43, wherein the assembly process is adapted to produce a plurality of items, the assembly process being divided into a plurality of stages, each item being represented by an order, wherein the material includes a part to be delivered by a supplier, and wherein computer system is adapted to establish an event in the assembly process when the order completes a predetermined stage and to generate a replenishment signal for the part, wherein the part is required at a later stage.

58. An apparatus, as set forth in claim 57, wherein the computer system is adapted to deliver the replenishment signal to the supplier and the supplier delivers the part in response to receiving the replenishment signal.

59. An apparatus, as set forth in claim 43, wherein the assembly process is adapted to produce a plurality of items, the assembly process is divided into a plurality of stages, and each item is represented by an order, wherein the material includes a part to be delivered by a supplier, and wherein the computer system is adapted to establish an event in the assembly process when a first order completes a predetermined stage and to deliver the replenishment signal to a supplier, wherein the replenishment signal is related to the part and wherein the part is required at a later stage for a second order.

60. An apparatus, as set forth in claim 59, wherein the computer system is adapted to deliver the replenishment signal to a supplier and the supplier delivers the part for the second order to the later stage in response to receiving the replenishment signal.

61. An apparatus, set forth in claim 43, wherein the computer system is adapted to dynamically determine a demand rate based on the actual demand and dynamically determine an order point based on the dynamically determined demand rate.

62. An apparatus, as set forth in claim 61, wherein the computer system is adapted to generate the replenishment signal when an amount of the material in process is less than the dynamically determined order point.

63. An apparatus, as set forth in claim 61, wherein the computer system is adapted to dynamically determine the demand rate and the order point periodically.

64. An apparatus, as set forth in claim 61, wherein the computer system is adapted to dynamically determine the demand rate and the order point upon the request of a user.

65. An apparatus, as set forth in claim 61, wherein the order point is calculated using the following formula:

OP=D×LT+SS, where OP is the order point, D is a demand rate, LT is a lead time, and SS is a safety stock.

66. A method of managing material supplied to an assembly process, comprising the steps of:

establishing an actual demand for the material;

generating a replenishment signal in response to the actual demand;

generating a demand view in response to said actual demand; and, requesting the material in response to the replenishment signal.

67. A method of managing material supplied to an assembly process, comprising the steps of:

establishing an actual demand for the material;

generating a replenishment signal in response to the actual demand; and, receiving the material in response to the replenishment signal.

* * * * *